(12) United States Patent
Shiell et al.

(10) Patent No.: US 6,317,820 B1
(45) Date of Patent: Nov. 13, 2001

(54) DUAL-MODE VLIW ARCHITECTURE PROVIDING A SOFTWARE-CONTROLLED VARYING MIX OF INSTRUCTION-LEVEL AND TASK-LEVEL PARALLELISM

(75) Inventors: Jonathan H. Shiell; David H. Bartley, both of Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/314,494

(22) Filed: May 19, 1999

Related U.S. Application Data
(60) Provisional application No. 60/088,314, filed on Jun. 5, 1998.

(51) Int. Cl.[7] .................................................. G06F 9/46
(52) U.S. Cl. .............................. 712/32; 712/24; 712/32; 712/200; 712/229; 712/245
(58) Field of Search .......................... 712/20, 24, 229, 712/245, 246, 32, 200

(56) References Cited

U.S. PATENT DOCUMENTS

| | | | |
|---|---|---|---|
| 3,573,852 | 4/1971 | Watson et al. | 709/107 |
| 3,728,692 | 4/1973 | Fennel, Jr. | 712/205 |
| 3,771,138 | 11/1973 | Celtruda et al. | 712/205 |
| 4,197,579 | 4/1980 | Otis, Jr. et al. | 712/214 |
| 4,229,790 | 10/1980 | Gilliland et al | 709/101 |
| 4,320,453 | 3/1982 | Roberts et al. | 712/246 |
| 4,344,129 * | 8/1982 | Asada et al. | 712/229 |
| 4,821,187 * | 4/1989 | Ueda et al. | 712/246 |
| 4,939,638 | 7/1990 | Stephenson et al. | 710/244 |
| 5,530,889 * | 6/1996 | Kametani | 712/247 |
| 5,539,911 | 7/1996 | Nguyen et al. | 712/23 |
| 5,574,939 | 11/1996 | Keckler et al. | 712/24 |
| 5,724,565 * | 3/1998 | Dubey et al. | 712/245 |
| 5,761,522 * | 6/1998 | Hisanaga et al. | 712/1 |
| 5,848,289 * | 12/1998 | Studor et al. | 712/32 |
| 6,170,051 * | 1/2001 | Dowling | 712/225 |

OTHER PUBLICATIONS

Mudge, Trevor, Strategic Directions in Computer Architecture, ACM Computing Surveys, vol. 28, No. 4, Dec., 1996, pp. 671–678.

Lo, Jack, et al., Converting Thread–Level Parallelism to Instruction–Level Parallelism via Simultaneous Multithreading, ACM Transactions on Computer Systems, vol. 15, No. 3, Aug., 1997, pp. 322–354.

* cited by examiner

Primary Examiner—Kenneth S. Kim
(74) Attorney, Agent, or Firm—Robert D. Marshall, Jr.; W. James Brady, III; Frederick J. Telecky, Jr.

(57) ABSTRACT

This invention is a very long instruction word data processor including plural data registers, plural functional units and plural program counters and is selectively operable in either a first or second mode. In the first mode, the data processor executes a single instruction stream. In the second mode, the data processor executes two independent program instruction streams simultaneously. In the second mode the data processor may respond to two instruction streams accessing only corresponding halves of the data registers and function units. Alternatively, the data processor may respond to a first instruction stream including instructions referencing the whole data processor employing A side function units by alternatively dispatching (1) instructions referencing the A side data registers and the A side function units and (2) instructions referencing the B side data registers and the B side function units. In the first mode, the data processor fetches N bits of instructions each cycle. In the second mode the data processor may fetch N bits of instructions for alternate program counters on alternate cycles or fetches N/2 bits of each of the first and second program counters. The data processor includes interrupt steering and masking control logic allowing instructions to control whether the first instruction stream or the second instruction stream receives interrupts.

9 Claims, 4 Drawing Sheets

DUAL-MODE VLIW ARCHITECTURE PROVIDING A SOFTWARE-CONTROLLED VARYING MIX OF INSTRUCTION-LEVEL AND TASK-LEVEL PARALLELISM

This application claims priority under 35 USC §119(e)(1) of Provisional Application No. 60/088,314, filed Jun. 5, 1998.

TECHNICAL FIELD OF THE INVENTION

The technical field of this invention is microprocessors and digital signal processors, particularly those employing very long instruction words (VLIW).

BACKGROUND OF THE INVENTION

This invention pertains to the field of VLIW (Very Long Instruction Word) microprocessors and digital signal processors (DSP). This type of processor is characterized by the capability to utilize a high degree of instruction level parallelism (ILP), if this is available in the current application. Software applications developed for these processors exhibit a varying degree of latent ILP. Instruction level parallelism is the degree to which instructions are independent of each other and can be performed in parallel rather than in series. Applications with low latent ILP cannot exploit the full capabilities of a VLIW processor at all times. It often happens that the performance over a period of execution having lower latent ILP could be improved if task-level parallelism (TLP) were available as an alternative. Task-level parallelism refers to the capability of the processor to perform more than one independent task or instruction thread simultaneously. Such independent tasks typically include at least dozens or hundreds of instructions directed to independent problems. This greater utilization of the VLIW processor comes from the fact that during a period of low latent ILP many of the functional units of the processor are idle and thus could be used to run code from another task (or thread).

VLIWs are highly effective for regular, loop-oriented tasks such as are typical of the performance-sensitive aspects of digital signal processing and other "number-crunching" applications. Many modern applications require that one processor serve a mixture of programming paradigms. For example, a real-time embedded DSP application mixes both DSP and control processing tasks. The latter tasks typically have little latent ILP. Multi-thread execution would better suit the application when it is not solely involved in time-critical DSP kernel inner loop execution.

This problem has been addressed in a number of ways. One example of the prior art is the VLIW approach to multithreading as shown in U.S. Pat. No. 5,574,939 entitled "MULTIPROCESSOR COUPLING SYSTEM WITH INTEGRATED COMPILE AND RUN TIME SCHEDULING FOR PARALLELISM" by Keckler et. al. Keckler et. al. shows a VLIW system that can execute multiple threads that have been intermixed at compile time into a single VLIW word. In this approach a number of different instruction streams, which would have needed separate program counters, are statically scheduled together and run as a single combined instruction stream under control of a single program counter.

For superscalar-processors (which can be considered a form of hardware assembled VLIW system) running multiple time interleaved code streams is proposed. First, fetch N instructions from stream A, then N instructions from B, or fetch from A until processing stalls then switch to B until processing stalls, etc. An example of this type of processor operation is shown in U.S. Pat. No. 3,771,138 entitled "APPARATUS AND METHOD FOR SERIALIZING INSTRUCTIONS FROM TWO INDEPENDENT INSTRUCTION STREAMS" by Celtruda, et. al. Celtruda, et. al. teaches a processor with dual instruction buffers that are executed from in a time multiplexed fashion. U.S. Pat. No. 4,320,453 entitled "DUAL SEQUENCER MICROPROCESSOR" by Roberts, et. al., also teaches multithreading by time multiplexing a processor. The primary VLIW machine patent from Denelcor, the HEP patent U.S. Pat. No. 4,229,790 entitled "CONCURRENT TASK AND INSTRUCTION PROCESSOR AND METHOD" by Gilliland, et. al. is also based on time multiplexing.

In addition a VLIW processor is particularly ill suited to interrupts. Interrupt handlers exhibit little ILP and switching the processor state to interrupt a VLIW's execution is costly and slow. Further, interrupt routines normally run only for a very short time. Thus a VLIW processor typically wastes resources handling interrupts.

SUMMARY OF THE INVENTION

This invention is a very long instruction word data processor including plural data registers, plural functional units and plural program counters. The data processor may be selectively operable in either a first or second mode. In the first mode program instructions are executed by selected ones of the data registers and selected ones of the functional units, under the control of a predetermined program counter. In the second mode a first program counter controls execution of program instructions using a first group of data registers and a first group of functional units, and a second program counter controls execution of program instructions using a disjoint second group of data registers and a disjoint second group of functional units.

Preferably, the plural data registers consists of an A side half and a B side a disjoint half, and the plural function units consists of an A side half and a B side disjoint set half. The first program counter is associated with the A side data registers and the A side function units and the second program counter is associated with the B side data registers and the B side function units. In the second mode the data processor can processes two independent program instruction streams simultaneously. The data processors includes plural control registers, at least one control register having duplicated for the A side and the B side. In the first mode operation is controlled by the A side component of the duplicated control register. In the second mode the A side component of the duplicated control register controls A side operation and the B side component of the duplicated control register controls B side operation.

The data processor may be changed from the first mode to the second mode and from the second mode to the first mode via instructions or the state of a control register.

In the second mode the data processor responds to two instruction streams, each accessing only corresponding halves of the data registers and function units. Alternatively, the data processor may respond to a first instruction stream including instructions referencing any of the data registers and any of the function units executed employing the A side function units by alternatively dispatching (1) instructions referencing the A side data registers and the A side function units and (2) instructions referencing the B side data registers and the B side function units. The data processor may include a set of B' side data registers equal in number of the number of B side data registers used by the first instruction stream. In this alternative the data processor responds to a second instruction stream including only instructions referencing half the data processors and half the function units executed employing the B side function units.

The data processor includes a program memory storing instructions. In the first mode the data processor fetches N bits of instructions from the program memory each cycle corresponding to the first program counter. In the second mode the data processor fetches N bits of instructions for alternate program counters on alternate cycles. Alternatively, in the second mode the data processor fetches N/2 bits of instructions corresponding to the first program counter, and fetches N/2 bits of instructions corresponding to the second program counter.

The data processor includes interrupt steering and masking control logic allowing instructions to control whether the first instruction stream or the second instruction stream receives interrupts.

BRIEF DESCRIPTION OF THE DRAWINGS

These and other aspects of this invention are illustrated in the drawings, in which.

DETAILED DESCRIPTION OF PREFERRED EMBODIMENTS

The preferred embodiments shown in this patent are based on, and assume a basic knowledge of, the Texas Instruments TMS320C62x/C67x family of processors, here-in-after referred to as the C6x processors or a C6x. For more information see the "TMS320C62x/C67x CPU and Instruction Set, Reference Guide" and the "TMS320C62x/C67x Technical Brief" both available from Texas Instruments, and both of which are herein incorporated by reference. For ease of explanation in the following some of the features or extensions that are part of the C6x specification have been omitted. To add them or other extensions would be readily apparent to one skilled in the art.

Figure 1:
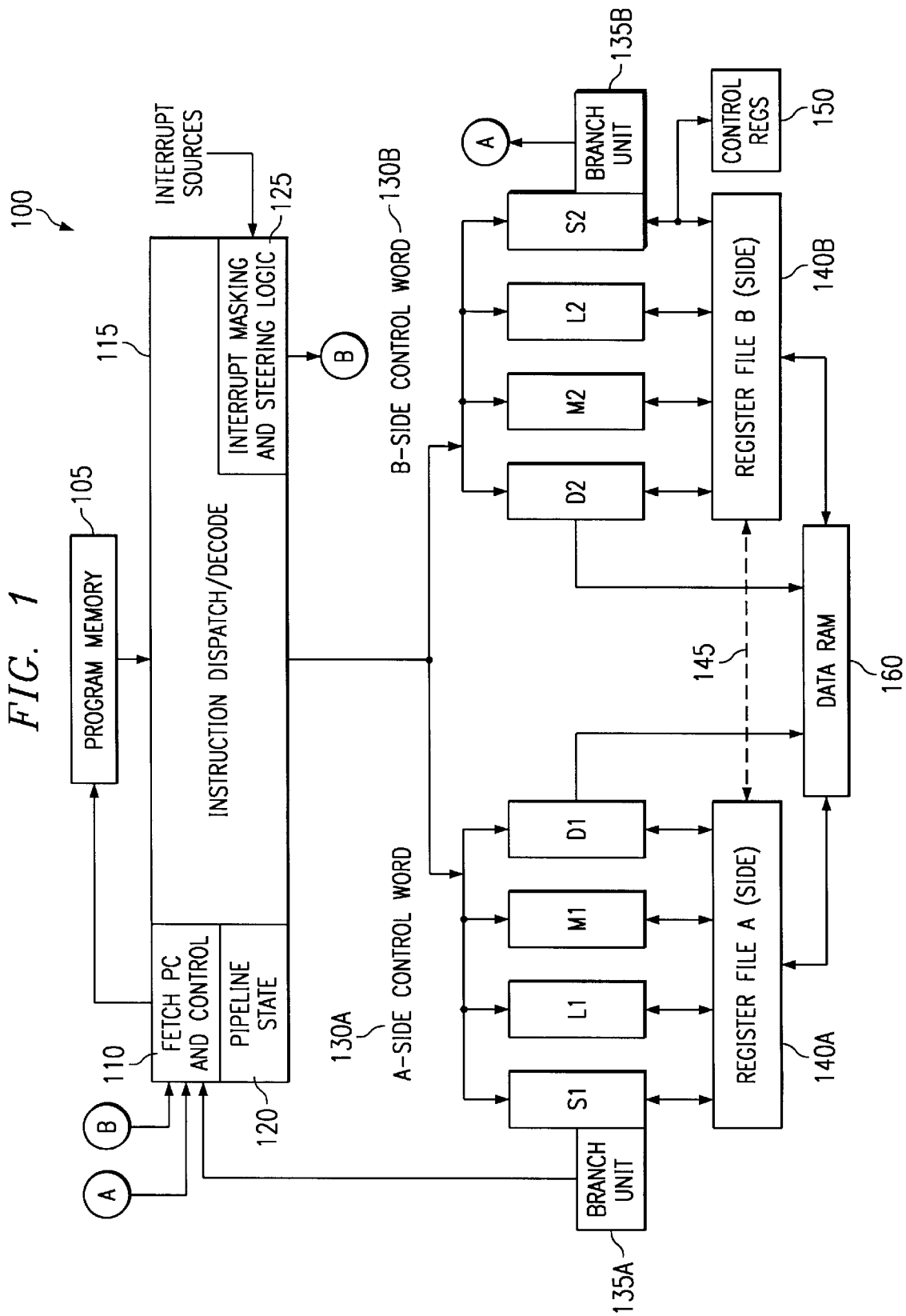
FIG. 1 shows a simplified block diagram of a Texas Instruments C62x family DSP core CPU plus program and data memories, which is an example of a VLIW processor known in the art.

Turning now to FIG. 1, a simplified drawing of the core of the example Central processing unit (CPU) 100 plus program memory 105 and data memory 160 of the C6x is illustrated. We will now review the operation of the example VLIW processor, as known in the art. Note that the C6x is a symmetrical VLIW processor, i.e. there are 2 sides, A side 130A and B side 130B. Both A side 130A and B side 130B include four functional units, called the S, L, M and D units, and respective register files 140A and 140B. In general in the C6x, the S units performs shift operations, the L unit performs logical operations, the M unit performs multiplies and the D unit performs data loads and stores. In addition this type of processor uses multiple instructions grouped together. Under software control (normally the compiler) instructions are grouped into blocks of 8 as a single VLIW. These block of 8 instructions are dispatched to the multiple functional units of the VLIW pipeline. A single VLIW in C6x terminology is referred to as an Instruction Packet.

The instruction packet addressed by Fetch program counter (PC) and control unit 110 in Instruction Dispatch/Decode unit 115 is fetched from program memory 105 into Instruction Dispatch/Decode unit 115. The Instruction Dispatch/Decode unit 115 decodes these component instructions, schedules them and lastly dispatches them to the specific function unit (S, L, M or D) and side as indicated by the instruction. Up to 8 instructions may be dispatched per cycle, four per side and one per functional unit. The sides 130A and 130B have respective branch units 135A and 135B that process program branches. If a branch is taken, the corresponding branch unit 135A or 135B directs the Fetch program counter and control unit 110 to start fetching from the new address. Interrupt processing occurs in interrupt masking and steering unit 125. If an interrupt is taken, then interrupt masking and steering unit 125 directs Fetch program counter and control unit 110 to start fetching from the address of a corresponding interrupt handler. If multiple branches and/or an interrupt are taken in one cycle, then a prioritization scheme is used to select one and the other events are either ignored or deferred. Pipeline state unit 120 consists of typical state information kept in a pipelined processor such as a program counter and status information for each stage of the pipe.

Prior to execution, each instruction on A side 130A or B side 130B has its register arguments read from the associated register file 140A or 140B. In addition, one cross register read is allowed per side via register cross path 145. Execution on each side shares data memory 160 and both sides 130A and 130B access data memory 160 independently. Control registers 150 provide additional information for use in controlling the operation of the C6x processor 100.

Thus this system can only process one instruction stream at a time, unless as shown in the prior art, it is provided with a single merged stream.

Figure 2:
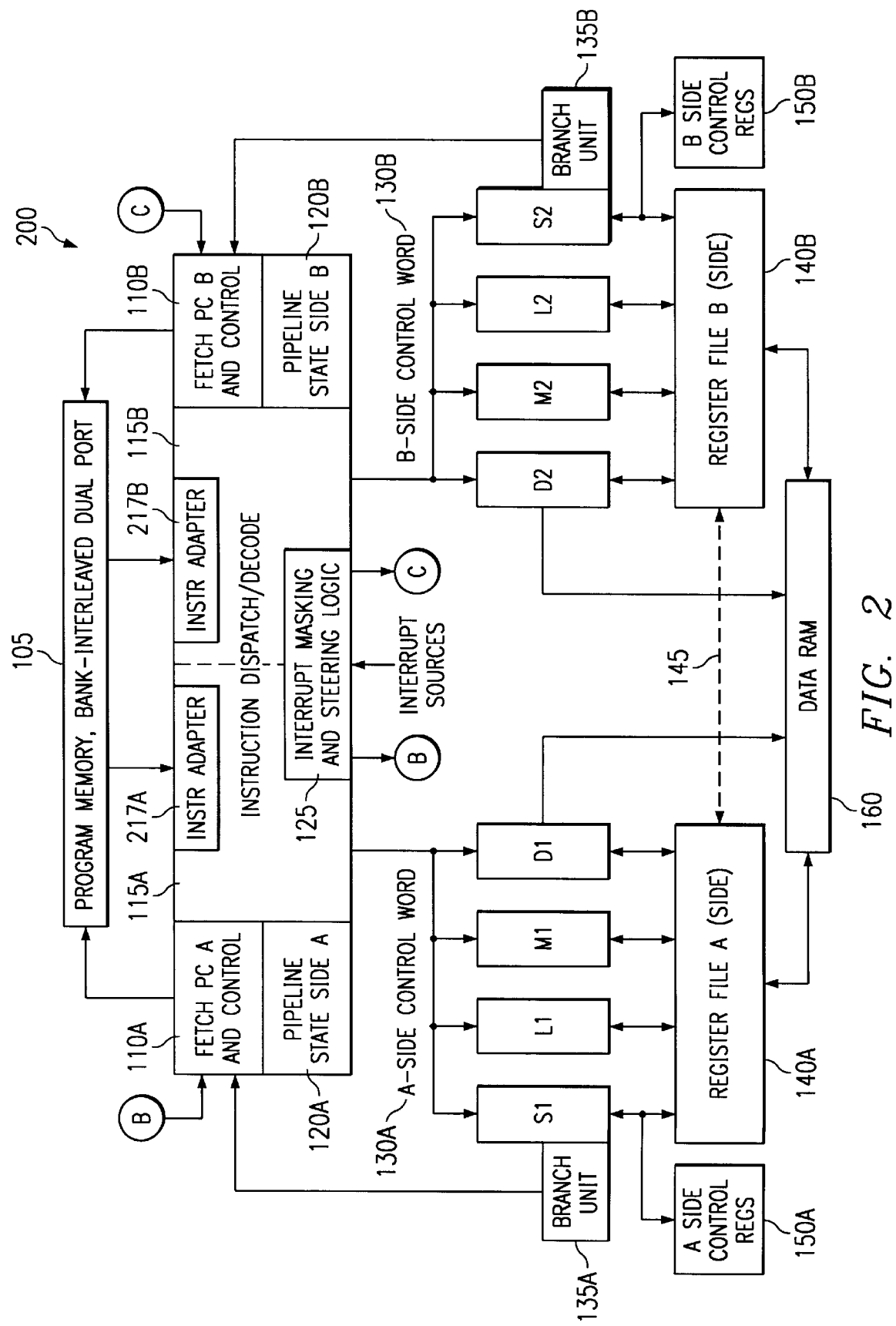
FIG. 2 is a block diagram of the processor of FIG. 1 modified according to one embodiment of this invention.

FIG. 2 illustrates one embodiment of this invention. Separate fetch program counter and control units 110A and associated control are provided for the respective A side 130A and B side 130B. There are also two ports from Program memory 105 into the Instruction Dispatch/Decode unit 115. Instruction Dispatch/Decode unit 115 has been split into two parts 115A and 115B. Added to respective units 115A and 115B are Instruction Adapters 217A and 217B. The Instruction adapters 217A and 217B feed instructions to A side 130A and B side 130B, respectively. Also Branch unit 135B now feeds into Fetch program counter and control unit 110B, instead of Fetch program counter and control 110 (FIG. 1). In addition all other pipeline state below the Fetch program counter and control units 110A and 110B are also split (i.e. duplicated) onto both the A and B sides, as units 120A and 120B. As are the control registers 150A and 150B.

While we show a symmetrical binary split for the C6x, the processor could be split into two or more asymmetrical portions (with some portions being symmetrical to each other but not to others). For the C6x this is the best split because the register file is already split into A and B sides for reasons of cycle time and interconnect cost, and the functional units on each side are pretty much symmetrical. Note that the preferred embodiment of this invention provides for symmetry in instructions in the various functional units that is not in the current C6x (such as Load/Store with 15 bit offset or Read/Write Control registers). While not an absolute requirement, it does make it easier to code with side independence and prevent the requirement that code be fixed to one side only.

Processor 200 illustrated in FIG. 2 operates as follows. Fetch program counter and control units 110A and 110B each fetch a half packet of instructions, (½ of a VLIW eight instruction packet) from program memory 105 (which is now dual ported), into respective Instruction Dispatch/Decode units 115A and 115B. Instruction Adapter units 217A and 217B bind the instructions to the A and B sides respectively. Then each side's dispatch and decode logic 115A and 115B prepares the half packets for execution as per a "normal" C6x. After which the instructions are dispatched to their respective sides (instructions on A side to the A functional units S1, L1, M1 and D1, and B instructions to the B units S2, L2, M2 and D2). From dispatch on the processor acts as a "normal" C6x except for the handling of changes in control flow such as interrupts and branches.

For the split processor, Interrupt masking and steering unit 125, which is not split, receives interrupt masks from both A side 130A control registers and B side 130B control registers. Interrupt masking and steering logic 125 checks to see which side is enabled for the interrupt and presents the interrupt accordingly. If both A side 130A and B side 130B are enabled for interrupts, then interrupt masking and steering logic 125 prioritizes these interrupts of one side receives its interrupt and on the other side the interrupt is stalled. In another embodiment only one side processes interrupts. In that case only the interrupt masks for that side are checked. This embodiment is preferred for many cases due to simplicity. If both sides are operable to take interrupts, then it is also desirable to have interrupt steering logic and an associated mask to allow a "master" side (task) to control which side can see which interrupts. This steering logic operates as an initial mask for an interrupt, i.e. in order for a side to see an interrupt both the corresponding architected mask in an interrupt enable register for that side and the value in the steering mask for that interrupt must allow it.

It may not be necessary to duplicate all normal C6x control register for the two sides. In most embodiments, only some of the control registers will have dual copies and other control registers will only exist on the "master" side. It is normally desirable to present an interrupt if the "slave" side attempts to write (or for some systems read) a control register for which it doesn't have a copy. Examples of control registers or portions of control registers which would be duplexed in the C6x embodiment include: AMR, which controls the addressing mode; CSR which includes the saturation and endian control bits, other bits could be nonduplexed read-only on slave side; and PE1 which stores the address of the executing instruction packet. The other control registers, which in the C62x, deal with interrupts wouldn't need to be duplexed if a "master" and "slave" side model is used. For the C67x (the floating point version), the additional control registers that deal with floating point control should also be duplexed.

Turning now to the operation of the instruction adapters 217A and 217B, instructions intended for use in the split mode are preferably written as A side instructions. Thus all fields that select A side 130A versus B side 130B are set to select the A side 130A except for cross file reads. At run time, B side instruction adapter 217B converts these fields into B side selections, while A side instruction adapter 271A converts any B side selections into A side selections. Note all that this requires in most cases is a simple bit flip (i.e. a "0" to a "1", or a "1" to a "0"). This which can be done with an OR function or an NAND function as required.

Various methods of invoking the split mode of this invention are possible such as new instructions or loading one or more control registers 150A or 150B. The latter is the preferred method and the following is an example of the contents of the "split" control register:

Bits Field
31: Enable split half stream A and half stream B (the first embodiment described above).
30: Enable cross file predication and reads (only valid with bit 31 set).
29: Enable cross file writes (only valid with bit 31 set).
28: Enable full stream A and half stream B (the second embodiment which is described below)
27: Enable the interrupt steering function (all interrupts to B side if 0)
26–16: reserved
15–0: Interrupt steering mask bits, one bit per interrupt as per IER control register ("0" is present to A side 130A, "1" is present to B side 130B)

The interrupt steering mask is presented here as a single bit mask, as an alternative a two bit per interrupt mask could be used, where the first bit controls presentation to the A side and the second bit controls presentation to the B side.

The following is an example of how a C6x system modified according to this invention converts from running a single thread in single PC mode, as in FIG. 1, to running dual threads in dual PC mode, as in FIG. 2. Assume the program has just finished an inner loop and now executes some control type code and checks for interrupts.

First the program writes a value to the control register "Split" that indicates that the processor is to be split. In the same cycle program execution jumps to new A and B side codes are issued, which establishes the new split mode program counter values. Then in the cycles between the issuance of the "split" and when the split takes effect, the program copys the contents of the AMR and CSR control registers from the controlling registers in normal mode to either A side control registers 150A or B side control registers 150B. Note that the pipeline address register PE1 is set by the hardware pipeline. Any other needed state registers are also copied in this period.

The first operation that the separate A side 130A and B side 130B instruction streams perform saves the contents of their respective register files, unless the invoking program has already done so or the contents are not needed in the future. One exception to this is if the new code streams need to change the control register contents (esp. AMR) this is done first, or done as part of the pre-split setup by the invoking program. After the general registers have been saved, then the "master" side either polls for interrupts or enables the selected interrupt masks. If an interrupt occurs, only the "master" side will be affected, the other side will continue it's processing unchanged.

The following is a sequential example of the above flow, presumes a store doubleword (registers n and n+1). If a faster switch is needed, then the store doubleword instructions could be extended to store quadword instructions (registers n, n+1, n+2 and n+3).

1. Disable interrupts, if needed, Setup the addresses of the split A and B side code streams,
   Setup the new split control/interrupt steering control value,
   Store (save) the resume address for the unsplit code stream into memory.
2. Load the "split" control register with it's new split control/interrupt steering control value (this operation together with the 2 following jumps takes 5 cycles to "finish"),
   Issue a jump on the A side to the A side split code stream,
   Issue a jump on the B side to the B side split code stream, Storedouble (save) R0a (A side general register 0) and R1a to old_tsk_GRs in memory.
Storedouble R0b and R1b.
3. Move the contents of the AMR control register into R0b,
Issue a load of the new values for R0a and R1a (takes 4 cycles to finish),
Issue a load of the new values for R0b and R1b.
4. Move the contents of the CSR control register into R1b,
Move the contents of R0b into AMR on A side
Storedouble R2a and R3a,
Storedouble R2b and R3b.
5. Move the contents of the IER control register into R0b
Move the contents of R0b into CSR on A side
Move R6b into R2a,
Storedouble R0b and R1b into Ctl_reg_save in memory
Storedouble R4a and R5a.
6. Move the contents of the ISTP control register into R1b
Move R7b into R3a,
Storedouble R6a and R7a,
Storedouble R4b and R5b.
7. Storedouble R0b and R1b into (Ctl_reg_save+8) in memory
Storedouble R2a and R3a. (actually R6b and R7b).
8. Machine is now running in split mode.

The converse, a "join" operation where the two sides are rejoined into a single thread, is also preferentially done by altering the "split" control register in this case by writing a value that indicates that the processor should be rejoined. Again in the preferred embodiment a jump would be issued from one side along with loading the control register, note the normal use would be the side that writes the control register also issues the jump. Another embodiment would be to issue the "join" without a jump and either, the fetch program counter and control unit 110A or 110B from the side that wrote the control register would take over when the "join" takes effect, or have a fixed side (say the master side) always take over after the "join". If instead of the "join" being activated by writing the control register it could also be done with one or more specialized instructions, or other methods known in the art.

In the preferred embodiment the program is responsible for saving and loading the general registers and control registers. So if the desired values, when joined, differ from the master copies contents when split, then the program needs to load the desired values. Note that when not running in split mode the processor only uses the master copy of the control registers. Also when split mode is exited, the interrupt steering function is ignored as it makes no sense. This would also be true for any other split mode only control functions provided.

Note if a more than 2 way split is provided, say for example either a 2 way or 4 way split is possible, then preferentially individual controls for each would be provided. For discussion purposes the four sections of a 4 way split will be referred to here after as A, B, C and D. The combined sections for a 2 way split is AB and CD, ABC and D or A and BCD. Thus one could split the processor into 2 or 3 (either AB/C/D, A/BC/D or A/B/CD) or 4 sections. Correspondingly joins on the 4 way would provide for going from 4 separate units back into either unsplit, 2 way or 3 way format.

One special feature of the split is the cross register file reads, writes and predication allowed by the C6x architecture. In this preferred embodiment these operate unchanged by the split and allow for a very fast form of interprocess communication between the instructions streams on the two sides of the processor. An example of this would be for the A side to poll for one of its registers being zeroed (via a predicated operation, say a jump) and the B side zeroing the register when a predetermined condition occurred. This of course assumes that the instruction streams for the two tasks are very tightly coupled and always run together or at least run together when this section of code is running. If this was not the case then problems could occur, such as: a different code stream was running on the A side using the register that B was to zero as a loop counter and then exited it's loop early because the B side cleared the register, or you could get a case where you get two writes to the same register from the different sides, which could cause hardware problems. Another alternative would be to prohibit cross file operations, or at least cross file writes, and take an exception (interrupt) if they are attempted.

Figure 3A:
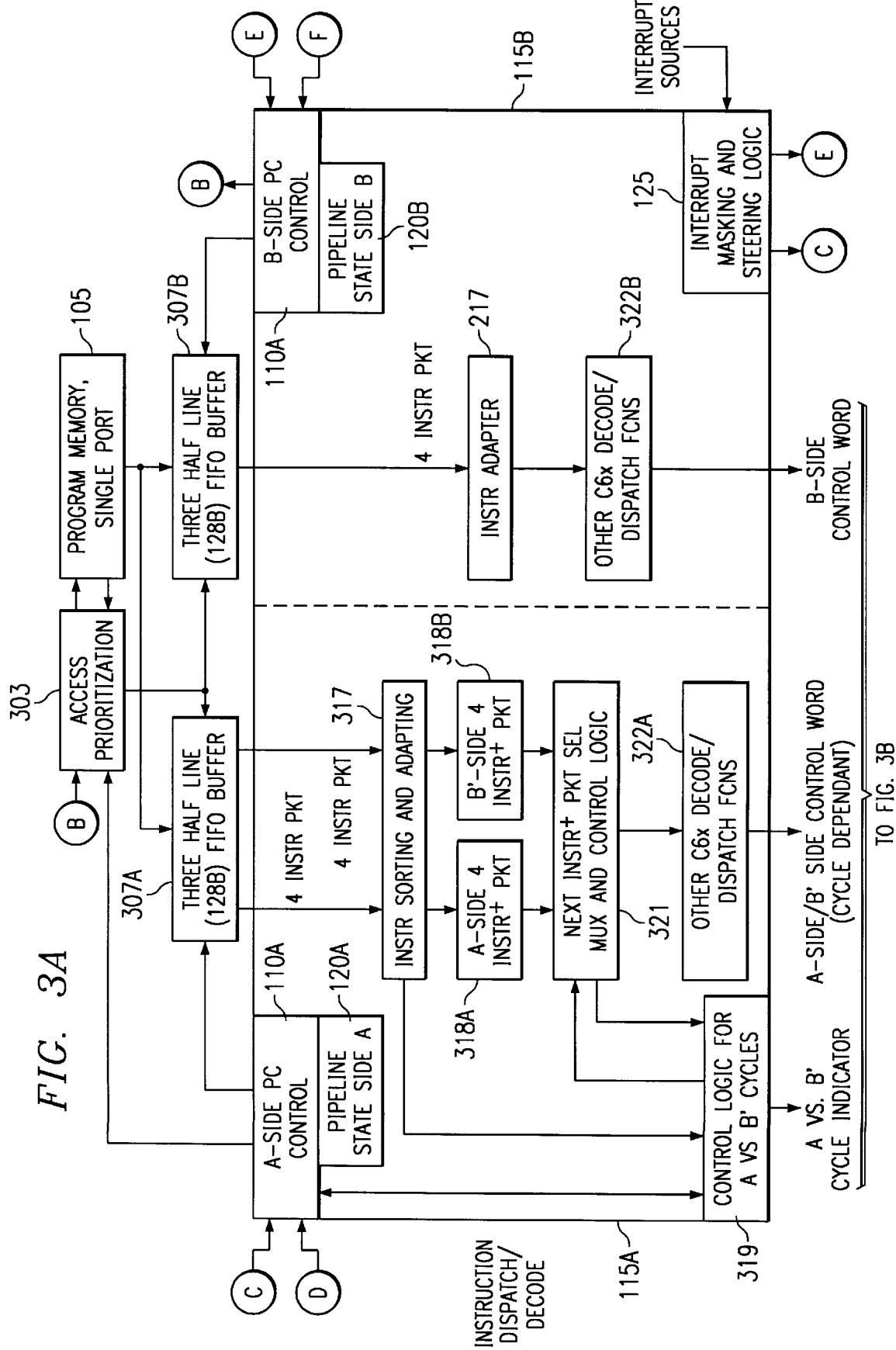
FIGS. 3A and 3B are the respective top and bottom halves of the processor of FIG. 1 modified according to another embodiment of this invention.
Figure 3B:
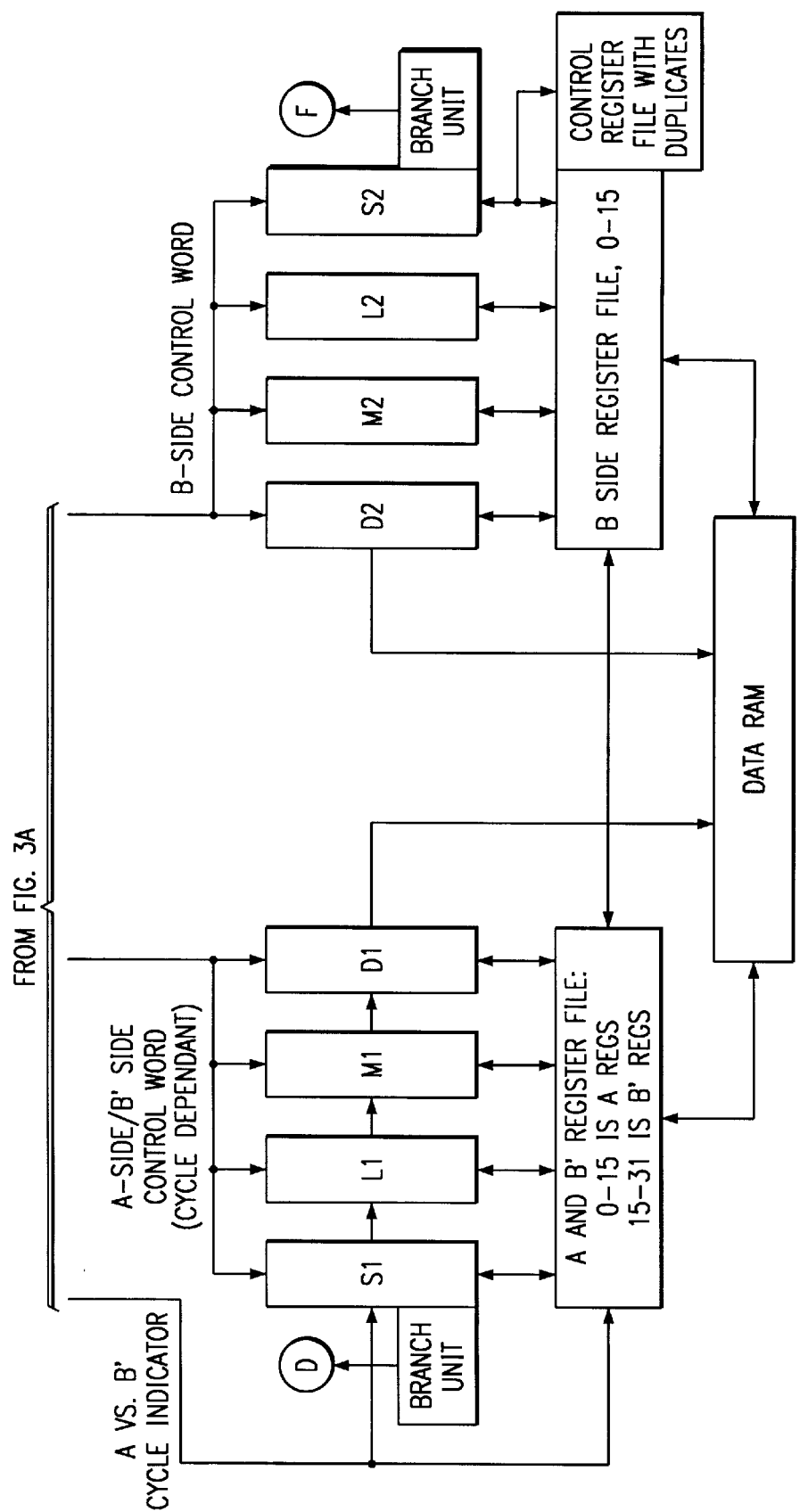

One shortcoming of the first embodiment is that the single image code stream needs to switch to a split (half size) stream as a different stream will run on the other half. Often this will be inconvenient. FIGS. 3A (top) and 3B (bottom) show another embodiment of the invention characterized by the ability to run, in split mode, a single image code stream at half speed on one side while a split stream is running at full speed on the other side. What is meant by half speed is that the A side instructions of the single image stream run on say even numbered cycles and the B side instructions run on the odd cycles, so it takes at least two cycles to run one single image group of 8 instructions. Of course it could take up to 8 cycles to run all 8 instructions if none are parallelized. At the same time, the B side runs at full speed executes a new half sized (4 instruction) group each cycle, assuming that all 4 instructions can be dispatched in parallel.

This embodiment requires the control registers to be duplexed both sets of the general registers need to be present on one side (i.e. the single image side needs copies of both the single image A and B register files while the split image B side needs it's own B side register file) thus doubling the size of the general register file on one side. Also the meaning of the cross register file reads, writes and predication changes, on the single image side they retain their normal function but refer to the "other cycle" state on the same side, while on the split image side they would normally be treated as invalid operations. So on the single image side a cross file operation occurring during an "A side" cycle would refer to the "B side" and vice versa.

This embodiment requires more work before a split, in that the single image side needs to copy over the general register file contents from the other side into it's own extended register file image. Or as an alternative an additional register file, "C" could be provided on the split image side and appropriate multiplexing and control provided to allow the single image side access to the A and B files while the split side accesses the C file, instead of the normal B file. This version would not need to save or copy the B register file prior to splitting.

Note that in this case as in the prior case neither memory (program or data) is modified as to size, the two instruction streams are expected to be coded in such a way as to allow coexistence. Although various methods of expanding the memory areas or virtually expanding them (i.e. caching) are well known in the art, the preferred embodiment requires the programmer keep track of the memory usage and partition it as needed (this is not seen as an unreasonable burden for the programmer).

Turning to FIG. 3A this embodiment shows another method of handling the need for "dual" access to the Program memory 105. In this case the memory outputs a full 8 instruction packet (256 bits) each cycle under control of Access Prioritization logic 303. This logic gets fetch program counter and control unit 110A and 110B from both sides 110A and 110B along with other control information and then selects which side to issue an instruction packet fetch for each cycle (if any). In normal operation each side will get a it's next group every other cycle, i.e. on even cycles side A gets an 8 instruction packet and odd cycles side B gets it's next packet. As neither side can consume more then 4 instructions in a cycle, FIFO buffering is provided on each side as units 307A and 307B respectively, this buffering is under control of the respective sides fetch program counter and control logic 110A and 110B. This type of prefetching is well known in the art and is shown here as an alternative to the dual porting of the first embodiment.

Looking at the B side, the functionality it is basically the same as in the first embodiment (this is the "split" side, the A side is the "single image" side), box 322B represents the circuits within instruction dispatch/decode logic 115 which prepares the half packets for execution and then dispatches them as per a "normal" C6x (as per the first embodiment). Interrupt masking and steering logic 125 while shown on the B side is not in-fact split and operates as in the first embodiment.

On the other hand, the A side has its functionality extended as follows. The instruction adapter 217A has been replaced by Instruction sorting and Adapting unit 317 which serves to sort the instruction packet into an A side packet 318A and a B side packet 318B. In addition any adapting of the instructions, which in some cases could involve adding extra bits to each instruction, is done here (i.e. the B side register address 0–15 is replaced with a register address B' which is 16–31 of the A side register file). Additional bits are added to each packet and to each individual instruction in the packet that indicate original order and parallelism, hence the packets are indicated as "instr$^+$pkt". Control logic 319 determines if an A side or B (referred to as a B') side cycle is to be done this cycle and indicates this to the rest of side A. Multiplexer 321 selects either the A side or the B' side packet (318A or 318B) under control of control logic 319. The selected packet is then processed by the "normal" C6x dispatch and decode logic as indicated for side B. This flow results in alternating A side packets and B' side packets flowing down the A side pipeline, giving the effect of a full single image packet executing at half the normal rate. As the A side can only perform 4 operations per cycle maximum any full packet that has more than 4 instructions for a single side will take an extra cycle to be processed, as will any full packet that doesn't have all of the parallel bits set. Thus up to 6 additional cycles maybe added for the case of completely serial code. As each new full packet starts with the A side the pipeline will sometimes see a sequence " . . . A, B', A, A, B' . . . " this occurs when the first packet ends with one or more A side instructions or an all A side instruction packet is processed, another sequence that can occur is " . . . A, B', B', A, B' . . . " this occurs when a packet of all B' side instructions follows a packet the ends with one or more B' side instructions. Of course both of the above sequences can occur more then once, i.e. you can see sequences such as: " . . . A, B', B', B', . . . , B', A, B', A, A, . . . , A, B' . . . ".

The following table shows the flow order of a set of instructions through the processor and will further illustrate the differences in performance implied by "half speed". The column titled "Normal C6x Flow" shows how a pair of instructions will flow through a standard (unsplit) processor and the column titled "Single Image A side" shows how the same instructions would flow on the single image side of the second embodiment of the invention. The last column titled "Split code B side", shown for comparison, shows the flow of a set of 4 half (four) instruction packets down the half sided "full speed" side. The columns "Normal C6x Flow" and "Single image A side" both operate on the following pair of instruction groups. In this example instructions within {} are to be executed in parallel within a single cycle (on the standard processor) and || means following instructions should appear to execute in parallel with the one(s) in the prior cycle (applies to the single image side only).

$1^{st}$ group: $A_{11}$ $A_{12}$ {$B_{11}$ $A_{13}$} $B_{12}$ {$B_{13}$ $B_{14}$} $A_{14}$
$2^{nd}$ group: {$A_{21}$ $B_{21}$ $A_{22}$ $B_{22}$} $A_{23}$ {$A_{24}$ $B_{23}$ $B_{24}$}.

| Cycle | Normal C6x Flow | Single image A side | Split code B side |
|---|---|---|---|
| 1 | $A_{11}$ | $A_{11}$ | {$C_{11}C_{12}$} |
| 2 | $A_{12}$ | $A_{12}$ | $C_{13}$ |
| 3 | {$B_{11}A_{13}$} | || $B_{11}$ (can't pair A's & B's) | $C_{14}$ |
| 4 | $B_{12}$ | $A_{13}$ | {$C_{21}C_{22}C_{23}C_{24}$} |
| 5 | {$B_{13}B_{14}$} | $B_{12}$ | $C_{31}$ |
| 6 | $A_{14}$ | {$B_{13}B_{14}$} | $C_{32}$ |
| 7 | {$A_{21}B_{21}A_{22}B_{22}$} | $A_{14}$ | $C_{33}$ |
| 8 | $A_{23}$ | {$A_{21}A_{22}$} | $C_{34}$ |
| 9 | {$A_{24}B_{23}B_{24}$} | || {$B_{21}B_{22}$} | $C_{41}$ |
| 10 | | $A_{23}$ | {$C_{42}C_{43}$} |
| 11 | | $A_{24}$ | $C_{44}$ |
| 12 | | {$B_{23}B_{24}$} | |

In the above table one can see that in split mode a set of instructions can take longer to execute then in unsplit mode due to the inability of the second embodiment to run A and B side instructions together. While this could be fixed by addition of a great deal more complexity, the limitation due to having half as many functional unit will remain. Note also that the table shows how the system will recognize parallel groups of mixed A's and B's and makeup all A and all B groups that can execute together, while this does involve apparent reordering (the A's execute one real cycle before the B's) the design of the processor keeps the state between the two cycles the same as if they executed in the same cycle where needed.

The only stalls that occur in a C6x are due to memory bank conflicts or if the Program memory is used as cache then stalls will also occur on cache misses. The preferred embodiments both stall the entire system (both sides) when a stall occurs on either side, like a normal C6x, this is done to keep control simple. Note however that it is possible to totally decouple the two sides as far as stalls, in which case a stall on one side wouldn't affect the other.

A further enhancement of the second embodiment, hereafter referred to as the third embodiment, adds the ability for the interrupt hardware to "roll" the normal full sized full speed code stream running on the processor over on the A side as a full sized half speed stream. This "roll" occurs without the full sized streams knowledge, the result of which is to free up the B side to run half sized full speed code for interrupt processing. This is done as follows:

1. An unmasked interrupt is received while processor 200 is running in joined mode (unsplit).
2. Interrupt masking and steering logic 125 causes processor 200 to start entering the split mode as described above in the second embodiment. This preferably employs the B and B' register files so no group copying is needed. The needed control registers and other state information are copied over to A side 130A. The A side fetch program counter and control unit 110A is left unchanged and A side 130A normally stalls while the switchover occurs. This should just take a few cycles.

3. The B side fetch program counter and control logic 110B is loaded with the proper interrupt handler address and started.

When the Interrupt (or other short "injected routine") finishes it exits via a post-amble that rejoins the processor so that the A side thread continues using the full processor as before the split.

Looking now at the software (i.e. real time operating system or RTOS) requirements of this capability, note that the interrupt handlers and other "time dependant" operations that may want to pre-empt B side 130B on occasion, need to be written in half side code words/units. These operations must execute the proper code to rejoin the processor for A side 130A, unless another small task is to run immediately following.

The job of the RTOS is more complex because it must now tradeoff two different types of code streams (full and half sized) and three processor configurations (unsplit, split two half side, split one full side and one half side). The compiler needs to comprehend and use the fact that it can split an intermixed code stream into separate sub-streams let them run split for a while then rejoin them later, if so desired. The compiler should be able to generate a full sized code stream when the amount of ILP per cycle exceeds a threshold and generate half sided code streams otherwise. Thus a task may consist of a number of cycles of full sized code followed by additional cycles of half sized code.

The real time operating system must understand that a full sized stream may elect to give up one side of the processor for a limited amount of time, so that the RTOS can run something on the unused side during this period. A method of indicating the amount of time available for the "guest" task should be indicated as part of the information passed (or available) to the RTOS. Note if the "guest" thread needs more time and is important enough, then it could elect to "roll" the full sized stream onto the A side in half speed mode while it finishes, then rejoin the sides.

In addition to the examples described herein, still other examples will be appreciated by one skilled in the art. Thus, while the present embodiments have been described in detail, various substitutions, modifications or alterations could be made to the descriptions set forth above without departing from the inventive scope which is defined by the following claims.

What is claimed is:

1. A very long instruction word data processor comprising:
   plural data registers consisting of an A side of one half of the plural data registers and a B side of a disjoint set of one half of the plural data registers;
   plural functional units consisting of an A side of one half of the plural function units and a B side of a disjoint set of one half of the plural function units;
   a first program counter associated with the A side data registers and the A side function units;
   a second program counter associated with the B side data registers and the B side function units;
   the data processor being selectively operable according to
      a first mode in which very long instruction word program instructions are executed by selected ones of the data registers and selected ones of the functional units, under the control of a predetermined one of the first and second program counters, and
      a second mode in which the first program counter controls execution of very long instruction word program instructions using the A side data registers and the A side functional units, and the second program counter controls execution of very long instruction word program instructions using the B side data registers and the B side functional units; and
   plural control registers, each control register being a writeable data register capable of storing information controlling operation of the data processor for more than one instruction cycle, at least one control register having an A side component and a B side component; and
   wherein
      in the first mode operation of data registers and function units is controlled by the A side component of the at least one control register, and
      in the second mode the operation of A side data registers and A side function units is controlled by the A side component of the at least one control register and the operation of B side data registers and B side function units controlled by the B side component of the at least one control register.

2. The very long instruction word data processor in claim 1, further comprising:
   interrupt steering and masking control logic allowing instructions to control whether the first instruction stream or the second instruction stream receives external interrupts.

3. A very long instruction word data processor comprising:
   plural data registers consisting of an A side of one half of the plural data registers and a B side of a disjoint set of one half of the plural data registers;
   plural functional units consisting of an A side of one half of the plural function units and a B side of a disjoint set of one half of the plural function units;
   a first program counter associated with the A side data registers and the A side function units;
   a second program counter associated with the B side data registers and the B side function units;
   the data processor being selectively operable according to
      a first mode in which very long instruction word program instructions are executed by selected ones of the data registers and selected ones of the functional units, under the control of a predetermined one of the first and second program counters, and
      a second mode in which the first program counter controls execution of very long instruction word program instructions using the A side data registers and the A side functional units, and the second program counter controls execution of very long instruction word program instructions using the B side data registers and the B side functional units; and wherein the data processor:
  is responsive in the second mode to a first instruction stream including instructions referencing any of the plural data registers and any of the plural function units controlled by the first program counter and executed employing the A side function units by alternatively dispatching (1) instructions referencing the A side data registers and the A side function units and (2) instructions referencing the B side data registers and the B side function units, and
  is responsive in the second mode to a second instruction stream including only instructions referencing one half of the plural data processors and one half of the function units controlled by the second program counter and executed employing the B side function units.

4. The very long instruction word data processor in claim 3, further comprising:
  a set of B' side data registers equal in number of the number of B side data registers, each B' side data register corresponds to one of the B side data registers;
  the first instruction stream employs the A side data registers and the B side data registers; and
  the second instruction stream employs the B' side data registers.

5. The very long instruction word data processor in claim 3, further comprising:
  a set of B' side data registers equal in number of the number of B side data registers, each B' side data register corresponds to one of the B side data registers;
  the first instruction stream employs the A side data registers and the B' side data registers; and
  the second instruction stream employs the B side data registers.

6. A very long instruction word data processor comprising:
  plural data registers consisting of an A side of one half of the plural data registers and a B side of a disjoint set of one half of the plural data registers;
  plural functional units consisting of an A side of one half of the plural function units and a B side of a disjoint set of one half of the plural function units;
  a first program counter associated with the A side data registers and the A side function units;
  a second program counter associated with the B side data registers and the B side function units;
  the data processor being selectively operable according to
    a first mode in which very long instruction word program instructions are executed by selected ones of the data registers and selected ones of the functional units, under the control of a predetermined one of the first and second program counters, and
    a second mode in which the first program counter controls execution of very long instruction word program instructions using the A side data registers and the A side functional units, and the second program counter controls execution of very long instruction word program instructions using the B side data registers and the B side functional units;
  a program memory storing instructions for control of the data processor; and
  wherein in the first mode the data processor fetches N bits of instructions from the program memory each cycle corresponding to the first program counter;
  wherein in the second mode the data processor on alternate cycles
    fetches N bits of instructions from the program memory corresponding to the first program counter, and
    fetches N bits of instructions from the program memory corresponding to the second program counter.

7. A very long instruction word data processor comprising:
  plural data registers consisting of an A side of one half of the plural data registers and a B side of a disjoint set of one half of the plural data registers;
  plural functional units consisting of an A side of one half of the plural function units and a B side of a disjoint set of one half of the plural function units;
  a first program counter associated with the A side data registers and the A side function units;
  a second program counter associated with the B side data registers and the B side function units;
  the data processor being selectively operable according to
    a first mode in which very long instruction word program instructions are executed by selected ones of the data registers and selected ones of the functional units, under the control of a predetermined one of the first and second program counters, and
    a second mode in which the first program counter controls execution of very long instruction word program instructions using the A side data registers and the A side functional units, and the second program counter controls execution of very long instruction word program instructions using the B side data registers and the B side functional units;
  a program memory storing instructions for control of the data processor; and
  wherein in the first mode the data processor fetches N bits of instructions from the program memory each cycle corresponding to the first program counter;
  wherein in the second mode the data processor fetches N/2 bits of instructions from the program memory corresponding to the first program counter, and fetches N/2 bits of instructions from the program memory corresponding to the second program counter.

8. A very long instruction word data processor comprising:
  plural data registers consisting of a predetermined number of disjoint sets of data registers;
  plural functional units consisting of the predetermined number of disjoint sets of function units; and
  a predetermined plural number of program counters;
  said data processor being selectively operable according to
    a first mode in which very long instruction word program instructions are executed by selected ones of the data registers and selected ones of the functional units, under the control of a predetermined one of the program counters, and
    a second mode in which a first program counter controls execution of very long instruction word pro gram instructions using a first group of data registers and a first group of functional units, and a second program counter controls execution of very long instruction word program instructions using a second group of data registers disjoint from said first group of data registers and a second group of functional units disjoint from said first group of functional units;

plural control registers, each control register being a writeable data register capable of storing information controlling operation of the data processor for more than one instruction, at least one control register having the predetermined number of components; and wherein
in the first mode operation of data registers and function units is controlled by a first component of the at least one control register, and in the second mode the operation of each instruction stream is controlled by a corresponding one of the predetermined number of components of the at least one control register.

9. The very long instruction word data processor in claim 8, further comprising:

interrupt steering and masking control logic allowing instructions to control which of the plurality of instruction streams receives external interrupts.

* * * * *